F. ROSE.
Corn-Husking Machine.

No. 225,026. Patented Mar. 2, 1880.

Witnesses.

Inventor.
Fabius Rose.
F. Curtis Atty.

F. ROSE.
Corn-Husking Machine.
No. 225,026. Patented Mar. 2, 1880.
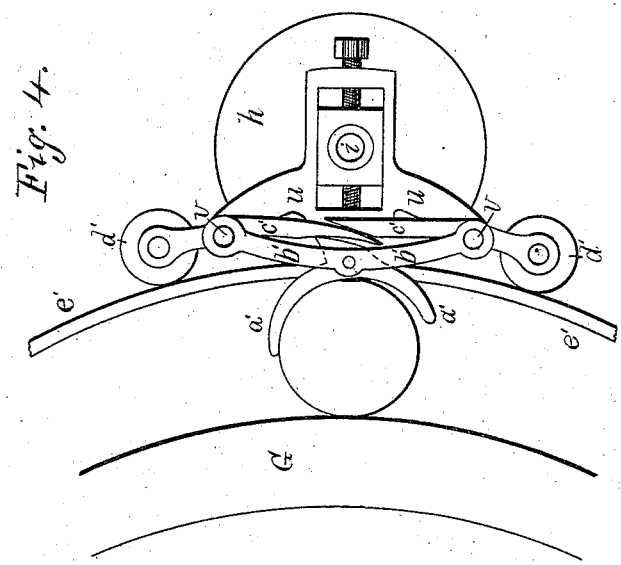
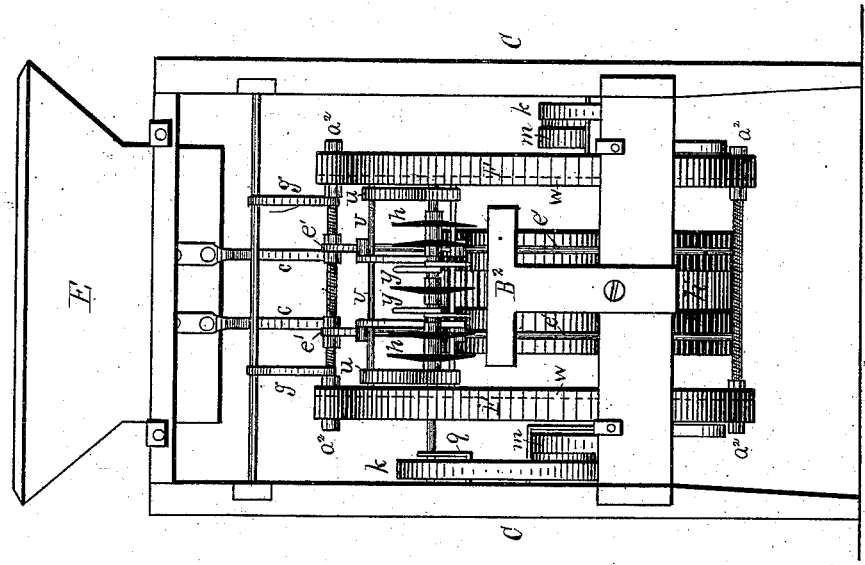

UNITED STATES PATENT OFFICE.

FABIUS ROSE, OF BOSTON, MASSACHUSETTS.

CORN-HUSKING MACHINE.

SPECIFICATION forming part of Letters Patent No. 225,026, dated March 2, 1880.

Application filed June 20, 1879.

*To all whom it may concern:*

Be it known that I, FABIUS ROSE, of Boston, county of Suffolk, and State of Massachusetts, have invented certain new and useful Improvements in Corn-Husking Machines, of which the following is a specification.

Figure 1:
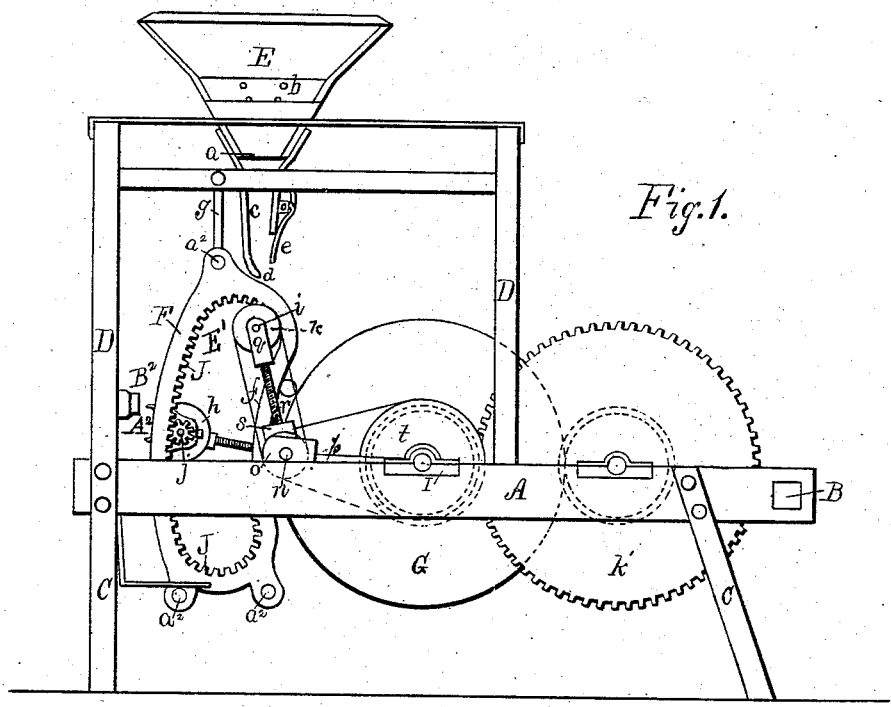
Figure 3:
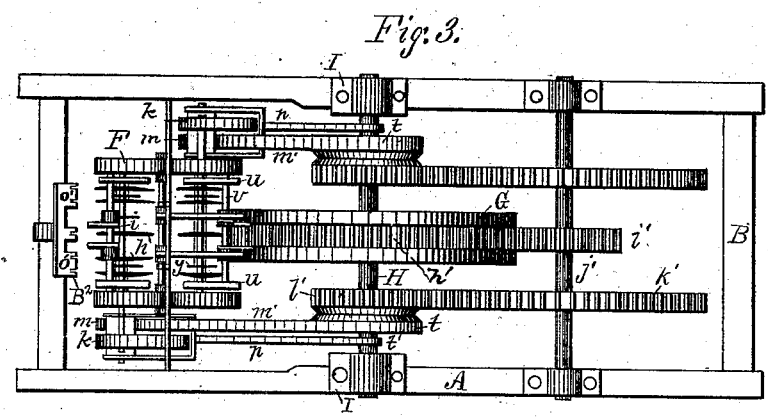

The drawings accompanying this specification represent, in Figure 1, a side elevation, in Fig. 2 a front end elevation, in Fig. 3 a plan, and in Fig. 4 an enlarged view of cutters, with ear of corn and brake mechanism operated by the ear, of a machine embodying my invention.

In the above-named drawings the frame of the machine is shown as composed of two horizontal side rails, A A, united by cross end rails, B B, and mounted upon legs C C, &c., while erected upon the rails A A is a secondary frame or scaffold, D, which supports a hopper, E, into which the ears of corn are thrown in bulk previous to being subjected to the operation of the machine.

The hopper E is flaring, and is contracted in width at bottom or outlet, as shown at $a$, so that but one ear of corn shall escape at a time, and I dispose within the said hopper, and parallel to the longest plane of the outlet, a series of horizontal rods, $b$ $b$, &c., in such number and disposition as practice shall demonstrate to be the most desirable and efficient, the purpose of the rods or bars being to give direction to the ears of corn and direct them properly to the opening of the hopper.

Depending from the bottom of the hopper, and immediately to one side of its outlet, are bars $c$ $c$, which terminate at bottom each in a bent lip, $d$, the two lips constituting rests to receive the ears of corn in succession as they escape from the hopper and deliver them to the bent levers or latches, which seize and present them to the action of the feed-drum, the ears as they descend being retained upon the rests until seized by the latches by spring-impelled arms $e$ $e$, also depending from the hopper and disposed opposite the hangers $c$ $c$.

The mechanism which cuts the husks to pieces and removes them from the ear is supported by a frame or carriage, E', composed of two open-end housings or annular plates, F F, of like shape and size, these housings being preferably oblong in shape and in the form of a segment of a circle struck from the center of the feed-drum before named, and which is shown in the drawings, at G, as affixed to a horizontal shaft, H, mounted in bearings or boxes I I, supported upon and centrally of the side rails, A A, of the machine-frame, the inner edge of each housing F having a toothed rack, J, cut upon it, with the exception of a portion, $f$, upon the edge nearest the feed-drum, the two housings being connected by cross-ties $a^2$ $a^2$, &c., and suspended from the upper part of the scaffold D by links $g$ $g$, in such manner as to be permitted a slight swinging motion toward or away from the drum, the gravity of the frame E' tending to force it toward the drum when not otherwise influenced.

The method by which I operate to remove the husks from the ears of corn is to cut the husks to pieces peripherally about the ear by rotary knives, and strip the husks thus cut up from the ears by means of arms radiating from the shaft of the knives and disposed between such knives. These circular rotary knives are shown at $h$ $h$ in the drawings, more especially in Fig. 4 of the drawings, as mounted upon a horizontal shaft, $i$, to each end of which a toothed pinion, $j$, is fixed, the teeth of such pinions meshing into the teeth of the racks J J, before named, while upon the extreme end of the shaft $i$ is mounted a pulley or sprocket-wheel, $k$, which, in its turn, is connected by band with a pulley, $m$, mounted upon a short horizontal shaft, $n$, supported in bearings in a yoke, $o$, affixed to one end of a horizontal rod or beam, $p$, disposed alongside one of the rails A, and embracing at its opposite end the shaft H, before alluded to, and supporting the feed-drum, the end of the pinion-shaft $i$, which carries the pulley $k$, passing through a yoke, $q$, which straddles such pulley, and is mounted upon the upper end of an upright adjustable bar or rod, $r$, which is erected upon a yoke, $s$, that, in turn, straddles the pulley or wheel $m$, before named, and is pivoted to the same shaft, while a second band or chain, $m'$, passes about the said pulley $m$ and a pulley, $t$, mounted loosely upon the shaft H.

The arrangement of the shaft $i$, three pulleys or wheels, $k$, $m$, and $t$, and the bands or chains $l$ and $m'$, with the rods or bars $p$ $r$ and yokes $o$ and $s$, is such that a knuckle-joint is provided and a yielding or flexible connection is obtained between the said shaft $i$ and the pulley $t$, which enables the shaft to rise and fall without impairing the power derived from said pulley $t$.

The cutter-shaft $i$ revolves within and is supported mainly by brackets $u\ u$, which, in turn, are supported by two horizontal parallel bars, $v\ v$, the ends of which are provided with bowls, and are received within channels $w\ w$, created in the inner face of the segmental annular housing F F, before named, the rotation of the pinions $j\ j$ serving to carry the cutter-shaft and its knives along the toothed racks J J, while the rods and channels last named serve to properly guide the movements of such shaft and knives and prevent their escape from the housings.

The knives or cutters are shown at $h\ h$ as circular in form and mounted preferably in pairs upon the shaft $i$, while between each pair of cutters are arranged several spikes or pins, $y\ y$, &c., that radiate from the said shaft and serve to strip from the ear of corn the husks severed by the knives.

To seize each succeeding ear of corn as it emerges from the hopper and drops upon the rests $d\ d$, and to carry such ear of corn to the feed-drum G, I affix to or mount upon the bars or rods $v\ v$, and centrally of the housings, a pair of crescent-shaped latches, $a'\ a'$, each latch being pivoted at its crown to a bar, $b'$, that spans the two rods or bars $v\ v$ in such manner as to be permitted slight swinging movements upon their pivots.

In addition to the latches $a'\ a'$, and situated below them, I pivot to the lower rod or bar $v$ two levers, $c'\ c'$, the outer end of which carries a bowl or anti-friction roller, $d'$, and these rollers $d'\ d'$ travel over or against the inner side of two curved rods or bars, $e'\ e'$, which constitute, in part, ways for such rollers, but also and mainly guides or bearings to operate with the drum and retain the ear of corn between them while the husks are being severed and stripped from it, the said curved bars or guides being preferably segments of a circle struck from the axis of the shaft H, and extending from the top to the bottom of the frame or carriage E' and in close proximity to the drum G. As the guides $e'$ are stationary and the drum rotates, it follows that an ear of corn caught between the two will be rolled about as it descends along the guides by the rotation of the drum, while the rotary cutters operate to cut through the husks thus cut up, so that by the time the ear of corn emerges from between the guides and drum and falls into a receptacle below the husks are entirely removed from it.

The guides $e'\ e'$ serve not only to guide the movement of the ear of corn, as stated, but also constitute a friction-brake to arrest too rapid descent of the cutters and their adjuncts, and this is brought about by the friction or pressure between the rollers $d'\ d'$ and said guides, for as the ear of corn comes in contact with the perimeter of the drum the latches $a'\ a'$ are turned partially upon their pivots and their lower ends wipe against the inner ends or tails of the levers $c'\ c'$, and by so doing crowd the rollers $d'\ d'$ against the guides and retard the descent of the cutters.

As before stated, the toothed rack J does not extend entirely about the inner periphery of each housing F, but is removed from the side nearest the drum G, and the blank or smooth portion $f$ between the ends of each rack is so calculated that as the ear of corn reaches the perimeter of the drum the pinions $j\ j$ escape from engagement with the rack J, and the knives descend free from control of such rack.

It will thus be seen, supposing the cutter to stand at the lower end of the blank spaces $f'$, that as the pulleys $k$, $m$, and $t$ rotate, (independently of and faster than the drum G, in manner as hereinafter stated,) the pinions $j\ j$ traverse the lower portion of the toothed rack, climb the sides of the housings, and cross the upper ends of the same, while at this point the pinions leave the rack and the pulleys and their bands exert no further action to advance the cutters, but the latter descend by their own weight until the pinions again engage the rack, when the pulleys again come into action to advance the cutters.

It is essential or desirable that the rotary cutters and strippers should revolve rapidly while the drum trundles the ear slowly along; and to effect this differential speed in one simple manner in which it may be carried out I proceed as follows: As before stated, the drum G is fixed to the shaft H and rotates with it, and the periphery of the drum is furnished with a toothed rack, $h'$, while engaging this circular rack is a pinion, $i'$, which, in turn, is mounted fixedly upon a horizontal shaft, $j'$, which spans the rails A A in rear of the drum, and is mounted in boxes affixed to such rails. Furthermore, upon the shaft $j'$, I affix a spur-gear, $k'$, which meshes into and drives a pinion, $l'$, secured to one side of the pulley $t$, before named; and as the gear $k'$ is of much larger diameter than that of the pinion $l'$, it follows that the pinion and pulleys $l'\ t$ are driven at a much greater rate of speed than the drum G, the slip between them taking place between the said pulley $t$ and pinion $l'$ on the shaft H.

To increase the capacity of the machine a second set of cutters and strippers and the accompanying mechanism may be employed, as shown at $A^2$ in the drawings, and consequently the pulleys $k$, $m$, and $t$, the yokes $o$, $q$, and $s$, and rods $p$ and $r$ must also be duplicated upon the opposite side of the drum G—in fact, are represented in the drawings.

To avoid the loss of time and labor usually consequent upon the stoppage of the machine and removal of the cutters to sharpen the latter, I employ stones or blocks of emery, vulcanite, or other material, as shown at $B^2$, and form slits $o'\ o'$, &c., in such blocks, and dispose them in the path of the cutters, as the latter describe their movement about the suspensories F F, the edges of the cutters passing through the slits and becoming thereby sharpened.

The several grinding-blocks B² may be reduced to a stack, which is applied adjustably to the machine-frame, in order that as the slits become worn or increase in width or otherwise lose their effect the block may be advanced and a fresh surface presented to the cutters.

In operating with this machine the ears of corn are thrown promiscuously into the hopper and find their way through the bars, by which they are presented in a uniform direction, and escape one at a time from the bottom of the hopper, to be seized by the advancing latches $a'$ $a'$, and by them carried to the perimeter of the drum G, and are caught between the latter and the guides $e'$ $e'$, the revolution of the drum causing the ear to roll about as it descends, the guides and the cutters $h$ $h$ and strippers $y$ $y$ serving to cut up and remove the husks during the passage of the ear between the drum and guides; and this operation is kept up with successive ears of corn so long as any remain in the hopper.

I claim—

1. In machinery for husking or shucking corn, the combination of a rotary drum, suitably supported and driven, and a pendulous carriage or frame, suspended in front of such drum and carrying a series of rotary cutters and strippers, the drum co-operating with guides attached to the carriage to advance and trundle the ear, and the cutters and strippers serving to cut up and remove the husks from such ear.

2. The combination, with the rotary drum, of the suspended cutter-carriage, as formed of open suitably-connected housings, having toothed racks upon a portion of their inner peripheries, and a pinion or pinions on the cutter-shaft engaging such racks to carry the cutters through the greater part of their going, substantially as and for purposes stated.

3. The cutter-carriage and cutter-shaft carried by and moving in said carriage, as described, in combination with the rotary drum and the curved rods or guides $e'$, attached to the said carriage and co-operating with said drum, substantially as hereinbefore set forth.

4. The combination, with the hopper, the cutter-carriage, and the cutter-shaft, of the pivoted latches arranged and operating to take the ear as it leaves the hopper and carry the same to the drum, substantially as hereinbefore set forth.

5. The hopper provided with the parallel horizontal bars, for the purpose of guiding and properly presenting the ears to the outlet of the hopper.

6. The pendent hooks or catches $c$ $c$ and spring-arms $e$ $e$, in combination with the hopper and the rotary cutters, to receive the ears of corn singly as they escape from the hopper and hold each ear until seized by the latches attached to the cutter-shaft, substantially as herein described.

7. The levers $c'$ $c'$, in combination with the latches, the cutter-shaft, and the guides $e'$ $e'$, such levers operating with the guides to retard the rapid descent of the cutters, substantially as stated.

8. The sharpening stones or blocks, in combination with the traveling rotary cutters, substantially as and for purposes stated.

9. The drum G, with its peripheral rack $h'$, shafts H and $j$, pinions $i'$ and $t$, and gear $k'$, in combination with the cutter-shaft and mechanism for communicating movement thereto from pinions $t$, as herein described, whereby a differential speed between the drum and cutter-shaft is effected.

10. The combination, with the cutter-shaft and drum-shaft, of a flexible or knuckle-jointed movement-transmitting mechanism, constructed and arranged as hereinbefore shown and set forth, to permit of rise and fall or other necessary movement of the cutter-shaft, substantially as herein described.

FABIUS ROSE.

Witnesses:
F. CURTIS,
H. E. LODGE.